(12) United States Patent
Gordon et al.

(10) Patent No.: US 7,733,346 B2
(45) Date of Patent: Jun. 8, 2010

(54) FACS SOLVING IN MOTION CAPTURE

(75) Inventors: Demian Gordon, Culver City, CA (US);
Parag Havaldar, Cerritos, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 11/829,731

(22) Filed: Jul. 27, 2007

(65) Prior Publication Data

US 2008/0024505 A1 Jan. 31, 2008

Related U.S. Application Data

(60) Provisional application No. 60/834,298, filed on Jul. 28, 2006, provisional application No. 60/834,132, filed on Jul. 28, 2006.

(51) Int. Cl.
*G06T 13/00* (2006.01)
(52) U.S. Cl. .................. 345/473; 345/629; 345/630; 345/639; 345/641; 345/644; 600/407; 607/14
(58) Field of Classification Search .................. 345/473, 345/629, 630, 639, 641, 644; 600/407; 607/14
See application file for complete search history.

(56) References Cited

U.S. PATENT DOCUMENTS

| | | | |
|---|---|---|---|
| 6,072,496 A * | 6/2000 | Guenter et al. | 345/419 |
| 6,300,960 B1 | 10/2001 | DeRose et al. | |
| 7,068,277 B2 | 6/2006 | Menache | |
| 7,239,321 B2 * | 7/2007 | Berger | 345/473 |

OTHER PUBLICATIONS

International Search Report and Written Opinion issued in International Patent Application No. PCT/US07/74749 on Oct. 27, 2008.
Terence Benja Küderle, "Muscle-Based Facial Animation", University of Applied Science Wedel (FH) Diploma Thesis, Feb. 2005.
Xiaohuan C. Wang et al., "Multi-Weight Enveloping: Least-Squares Approximation Techniques for Skin Animation", Association for Computing Machinery, Inc., 2002.

* cited by examiner

*Primary Examiner*—Kimbinh T Nguyen
(74) *Attorney, Agent, or Firm*—Procopio, Cory, Hargreaves & Savitch LLP

(57) ABSTRACT

A method, comprising: generating facial muscle activations from facial marker data; animating a computer graphics facial model using the facial muscle activations; generating a skin layer overlaying the computer graphics facial model; and animating the skin layer using the facial marker data.

23 Claims, 8 Drawing Sheets

FACS SOLVING IN MOTION CAPTURE

CROSS-REFERENCE TO RELATED APPLICATIONS

This application claims the benefit of priority pursuant to 35 U.S.C. §119 of co-pending U.S. Provisional Patent Application No. 60/834,298, filed Jul. 28, 2006, entitled "FACS Solving in Motion Capture," the disclosure of which is hereby incorporated by reference.

This application further incorporates by reference the disclosures of commonly assigned U.S. Pat. No. 7,068,277, filed May 23, 2003, entitled "System and Method for Animating a Digital Facial Model"; U.S. patent application Ser. No. 10/427,114, filed May 1, 2003, entitled "System and Method for Capturing Facial and Body Motion"; U.S. patent application Ser. No. 11/739,448, filed Apr. 24, 2007, entitled "Performance Driven Facial Animation"; and U.S. Provisional Patent Application No. 60/834,132, filed Jul. 28, 2006, entitled "FACS Cleaning in Motion Capture."

BACKGROUND

The present invention relates generally to motion capture, and more particularly to methods and systems for animating a skin layer overlaid on a digital facial model.

Motion capture systems are used to capture the movement of a real object and map it onto a computer-generated object as a way of animating it. These systems are often used in the production of motion pictures and video games for creating a digital representation of an object or person that is used as source data to create a computer graphics ("CG") animation. In a typical system, an actor wears a suit having markers attached at various locations (e.g., small reflective markers are attached to the body and limbs). Precisely-placed digital cameras then record the actor's body movements in a capture space from different angles while the markers are illuminated. The system later analyzes the images to determine the locations (e.g., spatial coordinates) and orientations of the markers on the actor's suit in each frame. By tracking the locations of the markers, the system creates a spatial representation of the markers over time and builds a digital representation of the actor in motion. The motion is then applied to a digital model in virtual space, which may then be textured and rendered to produce a complete CG representation of the actor and/or the performance. This technique has been used by special effects companies to produce realistic animations in many popular movies.

Capturing the motion manifesting an actor's facial expressions entails an approach similar to capturing body movements. However, it is not practical for the actor to wear a "suit" on his or her face. Moreover, human facial expressions involve facial muscle movements significantly more subtle than typical body motions. For facial motion capture, markers are affixed instead directly to the actor's face, usually positioned to optimally define facial movements. The markers are further applied in sufficient number to capture the many subtle types of facial muscle movements. However, a large number of markers and their proximities makes post-capture frame-to-frame marker tracking difficult, and requires significant manual processing to ensure that each individual marker is accurately tracked.

These data are cleaned to substantially alleviate the tracking difficulties. However, a further problem often arises when the captured facial marker data that are used to animate the digital facial model also do not spatially match the digital facial model well. The skin of the character often assumes a discontinuous appearance in the resulting facial animation.

SUMMARY

Embodiments of the present invention include systems, methods, apparatus, and computer programs to implement techniques of generating and animating a skin layer on a digital facial model.

In one aspect, the method includes: generating facial muscle activations from facial marker data; animating a computer graphics facial model using the facial muscle activations; generating a skin layer overlaying the computer graphics facial model; and animating the skin layer using the facial marker data.

In another aspect, the system includes a facial muscle activations module to receive facial marker data and to generate facial muscle group activations; an animation module to receive the facial muscle group activations and generates an activated facial model; and a skin layer module to receive the activated facial model and the facial marker data, and to generate an animated skin-layered facial model.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
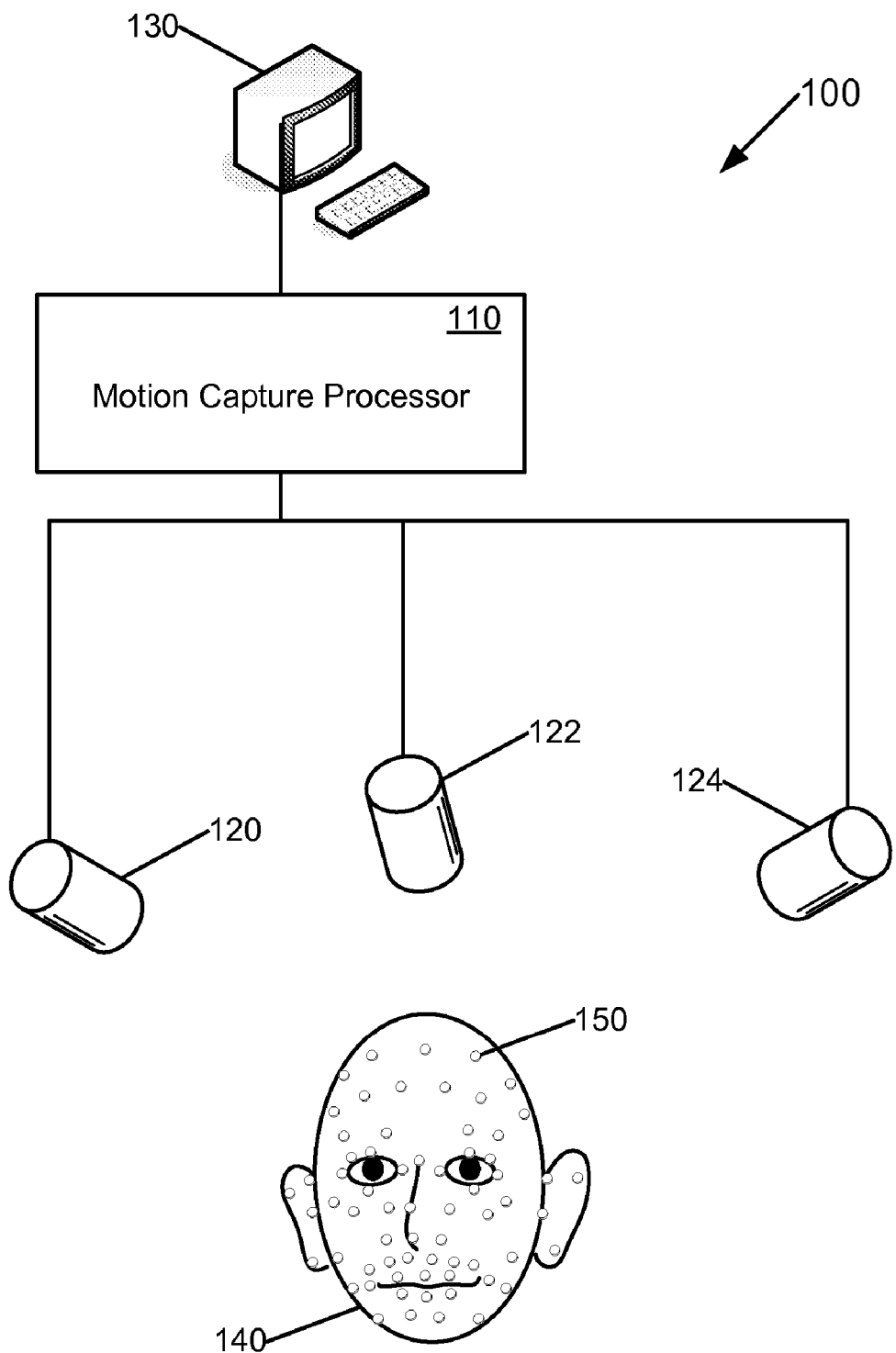
FIG. 1 is a functional block diagram of a facial motion capture system.

Certain embodiments as disclosed herein provide for systems and methods of generating and animating a skin layer on a digital facial model. For example, one method as disclosed herein allows for generating facial muscle activations from facial marker data; animating a computer graphics facial model using the facial muscle activations; generating a skin layer overlaying the computer graphics facial model; and animating the skin layer using the facial marker data.

Animating the skin layer may include associating a facial marker data point with a corresponding area of the skin layer, and moving the corresponding area of the skin layer. Moving the area of the skin layer: (1) corresponds to a displacement between the spatial positions of the facial marker data point and a temporally associated data point of another frame; and (2) includes applying the displacement at a predetermined position on the area of the skin.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

A Facial Action Coding System ("FACS") provides a standard taxonomy for systematically categorizing human facial expressions. Facial movement data representative of various facial expressions are captured using a facial motion capture system such as that depicted in FIG. 1, and can then be categorized according to a FACS. Tracking errors will cause anomalies in the trajectories of labeled marker data, thus making the data unsuitable for categorization.

Implementations of a FACS cleaning system include systems and methods for removing various tracking errors and improving stability of the captured marker data in virtual space. Utilizing a FACS, a FACS cleaning system (described in detail in U.S. Provisional Patent Application No. 60/834,132, filed Jul. 28, 2006, entitled "FACS Cleaning in Motion Capture"), a type of performance driven facial animation (described in detail in U.S. patent application Ser. No. 11/739,448, filed Apr. 24, 2007, entitled "Performance Driven Facial Animation"), and facial marker data, an animated digital facial model having an animated skin is generated.

In one implementation of the present invention, clean data are received and processed with a FACS matrix. That is, the "cleaned" data are substantially relieved of temporal marker gaps, mislabeled markers, and noise. A FACS matrix is an implementation of a FACS, wherein a plurality of facial poses are maintained. Each facial pose in the FACS matrix is representative of a substantially distinct type of pose as performed by a particular actor. The FACS matrix is then used again with the facial marker data to determine which muscle groups are activated by the particular pose captured in the facial marker data. Muscle group activations are used to animate accordingly the digital facial model of a CG character.

Modelers often develop face shapes for the digital facial model to correspond with poses provided by each actor and stored in a FACS matrix. The face shapes are activated by facial muscle group activations derived using the FACS matrix. This results in the animation of the digital facial model.

The animation sometimes leads to discontinuities on the skin of the digital facial model, which resembles segmentations of the skin, because the various poses made by the digital facial model are triggered in an on-or-off manner. That is, the skin of the digital facial model is not directly influenced by the facial marker data in conjunction with the FACS matrix. Instead, the facial marker data are used to trigger the activations of the various face shapes developed by a modeler.

To compensate for resulting discontinuities on the skin, an additional skin animation method (sometimes referred to as a "direct drive" method), similar in some ways to performance driven facial animation, is applied to the top layer of a digital facial model that has already been animated by triggering facial muscle groups. A direct correspondence is developed between the facial skin of the digital facial model and the facial marker data. As the facial marker data points move, they also pull on the skin layer directly. This is overlaid as a separate layer on the digital facial model, and can be used to achieve a variety of effects. For example, the natural jiggling of the skin of an actor's face can be dampened on the face of a corresponding animated character, or alternatively, can be overdriven just as easily to exaggerate the effect. Thus, activating muscle groups through the FACS matrix, followed by driving movements of a skin layer with facial marker data, provides not only control over the animation in the conventional sense (characters do not go off model), but also allows for the skin to be as dynamic as it was on the actor's face when it was captured.

FIG. 1 is a functional block diagram of a facial motion capture system 100 including a motion capture processor 110, motion capture cameras 120, 122, 124, a user workstation 130, and an actor's face 140 applied with a plurality of facial markers 150. The motion capture processor 110 can be connected to the workstation 130 by wire or wirelessly. The motion capture processor 110 is typically configured to receive control data packets from the workstation 130.

In the illustrated implementation of FIG. 1, three motion capture cameras 120, 122, 124 are connected to the motion capture processor module 110. However, more or less than three motion capture cameras can be used according to a variety of user and animation-related requirements. The motion capture cameras 120, 122, 124 are focused on the actor's face 140, on which surface spherical facial markers 150 have been placed at specific target points. Although the facial markers 150 are illustrated as having been placed in specific positions on the actor's face 140, it is often the case that the facial markers 150 are placed so as to optimize capture of specific facial muscle groups, or other defined areas of the actor's face 140.

The motion capture cameras 120, 122, 124 are controlled by the motion capture processor 110, and they capture frame-by-frame two-dimensional ("2-D") images of the markers. The image data thus captured can typically be stored and/or viewed in real-time at the user workstation 130. The frames of 2-D image data acquired by each of the motion capture cameras 120, 122, 124 are integrated by triangulating the spatial positions of the motion capture cameras 120, 122, 124 in the capture space. This integration process is called "reconstruction," and frames of volumetric facial marker data are generated at output. Each facial marker data point in a frame includes a corresponding spatial position, and the frames of volumetric facial marker data form a temporal sequence essentially of three-dimensional ("3-D") samples of the volume in which the actor's facial movements were captured during a performance.

The sequence of frames of reconstructed volumetric facial marker data is referred to as a "beat," which usually represents a "take," during which an actor's performance is captured. The motion capture processor 110 performs a tracking function of a beat. The tracking is performed to accurately associate the facial markers of each frame with the corresponding facial markers of other frames in the beat, both preceding and following it in the sequence. A unique label is assigned to each facial marker data point and tracked through the length of the beat, thus resulting in a trajectory trace for each facial marker data point. Once the temporal associations are completed, the resulting facial marker data include in each frame a system of vertices in virtual space, each vertex represented by a labeled marker. The system of vertices comprises a modeled surface representing the actor's face 140.

It is intended for the facial marker data point representing a specific facial marker 150 in a particular frame to be temporally associated with the facial marker data point representing the specific marker 150 in a subsequent frame. A proper temporal association of the facial marker data points representing the specific facial marker 150 generates a smooth and connected trajectory that represents the motion of the specific marker 150. However, tracking errors can occur.

Tracking errors commonly include improperly associating a facial marker data point in one frame with a facial marker data point in a next frame, usually causing an apparent jerk in the motion of the resolved trajectory of a facial marker 150. The errors may further manifest as a repetitive twitch when a facial marker 150 is continually mis-labeled over a sequence of frames. Other examples of errors include bad triangulation, reconstruction of poorly seen views of objects, and mathematical "ghosts" that are correct in two axes but wrong in the third axis.

Figure 2:
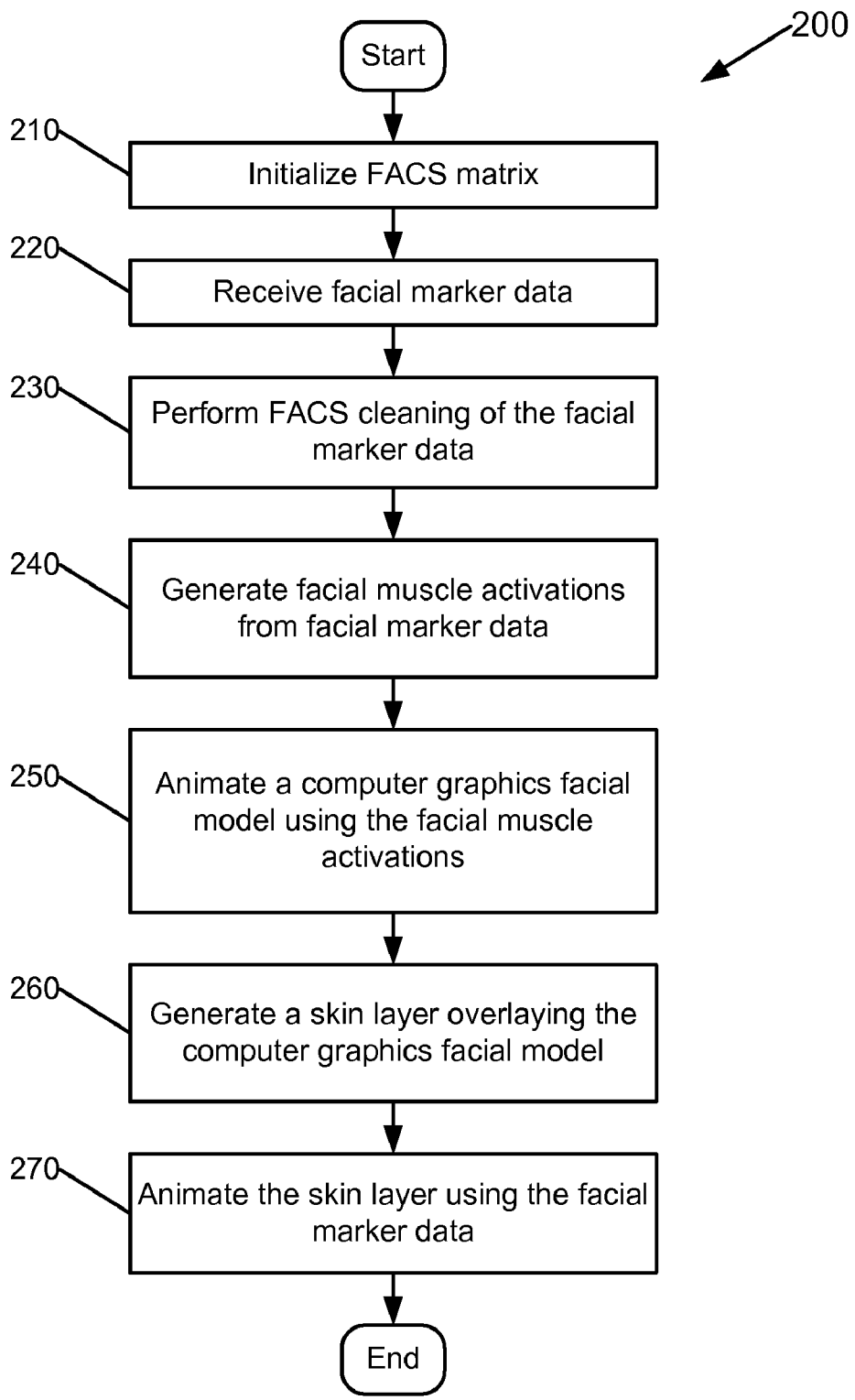
FIG. 2 is a flowchart illustrating a method of animating a digital facial model in accordance with one implementation.

FIG. 2 is a flowchart illustrating a method 200 of animating a digital facial model in accordance with one implementation. In the illustrated implementation, a FACS matrix is initialized, at block 210. Initialization essentially includes defining FACS action units in the FACS matrix, and calibrating associated poses for the actor, and is described in more detail below in relation to FIG. 3.

Facial marker data are received, at block 220. The facial marker data comprise a sequence of frames of volumetric data, each frame including a plurality of facial marker data points, and each facial marker data point including a spatial position. As discussed above, a tracking process has temporally and substantially associated each facial marker data point with a facial marker data point of at least one other frame of the sequence of frames. Typically, each facial marker data point is temporally associated with a facial marker data point in a plurality of other frames of the sequence of frames, forming a trajectory through the volume defined within that sequence.

At block 230, the facial marker data are cleaned to relieve the data of temporal-associative gaps, facial marker data point mislabeling, and noise. Temporal-associative gaps occur when labeling has failed for one or more facial marker data points in a frame, for example, resulting in a "gap" between the properly labeled points of the adjacent frames in the sequence. Sometimes one or more points in a frame are mislabeled, thereby temporally associating them improperly with points in the adjacent frames. A discontinuity thus occurs in the trajectory of the otherwise properly labeled points in the adjacent and other frames of the frame sequence. Noise can be present in the facial marker data due to small errors occurring during image acquisition and/or reconstruction, for example, causing a small displacement of the resolved spatial position of a facial marker data point from its true spatial position. In one implementation, the cleaning is performed according to the method 400 illustrated by the flowchart of FIG. 4.

At block 240, facial muscle activations are generated from facial marker data. Generating facial muscle activations essentially includes: determining weights that characterize a weighted combination of action units approximating the facial marker data; and generating a weighted activation. Generating facial muscle activations is described in more detail below in relation to FIG. 5.

A computer graphics ("CG") facial model is animated using the facial muscle activations, at block 250. In one implementation, the CG facial model is a digital facial model that has been "rigged" by an artist or animator. Rigging the digital facial model includes setting up different fascia layers, which are blended to create a final facial deformation on the digital facial model. The fascia layers in one implementation include a muscle layer that allows facial muscle deformations, a jaw layer that allows jaw movement, a volume layer that controls skin bulges in different facial areas, and an articulation layer for pronounced lip movement.

The muscle layer includes skull patches with muscle controls that deform the face. The muscle controls are activated by weighted activations generated from motion capture data. The jaw layer helps to control movements of the jaw of the digital facial model. The volume layer adds volume to the deformations occurring on the digital facial model. Thus, the volume layer aids in modeling wrinkles and other facial deformations, which can be triggered by weighted activations generated from motion capture data. The articulation layer relates to the shape of the lips as they deform. In particular, the articulation layer aids in controlling the roll and volume of lips, which is essential when the lips thin out or pucker in facial expressions. Facial marker data are mapped, or retargeted, onto the digital facial model as weighted activations that trigger the various fascia layers. That is, the weights quantify the proportional influence that each of one or more predetermined poses exerts in triggering the fascia layers.

Sometimes, however, triggering the fascia layers with the weighted activations as discussed leads to an undesired segmentation effect on the surface of the CG facial model. That is, the various muscle groups that are triggered exhibit discontinuities at their interstices. Overlaying the CG facial model with a separate skin layer smoothes the interstitial discontinuities, and provides another medium through which an artist or animator can control the appearance of the resulting facial animation.

Accordingly, skin layer overlaying the CG facial model is generated, at block 260. In one implementation, this skin layer is generated as a separate component from the four fascia layers discussed above. The skin layer conforms to the outer surface of the CG facial model. It may be infused with various visual attributes, including, for example, a color, a texture, transparency, hair, and/or fur. The skin layer may also be infused with various physical attributes, including, for example, elasticity, thickness, and density. In another implementation, the skin layer is partitioned into a plurality of regions, each region corresponding to a facial marker data point.

The skin layer is then animated using the facial marker data, at block 270. In one implementation, the movement of each facial marker on the actor, expressed in the trajectory of each facial marker data point through the sequence of frames, is transferred to a corresponding region of the skin layer. That is, each facial marker data point, which exhibits a spatial displacement (i.e., a change in spatial position) from frame to frame, exerts a corresponding displacement on the corresponding region of the skin layer. In one implementation, the displacement thus applied to the region of the skin layer resembles a "pull" on the skin. It will be appreciated that depending upon the actor's performance, not all facial marker data points will be moving at a particular time.

In one implementation, the displacement of each facial marker data point is applied at a predetermined position in relation to the corresponding region of the skin layer. In one example, the displacement is applied at the center of mass of each region, according to a density determination of that layer. In another implementation, the displacement of each facial marker data point is distributed over the corresponding region according to a surface spreading function. For example, the displacement of a facial marker is applied uniformly over the corresponding region. In another example, the displacement of a facial marker is applied at the center of the corresponding region and distributed over the region according to a gaussian distribution.

In another implementation, the displacement of each facial marker data point is modulated. Examples of modulations include, but are not limited to, scaling the displacement and/or modifying the direction of the displacement according to linear and nonlinear functions. In another implementation, the displacement of a facial marker data point is distributed over a corresponding region according to an elasticity function associated with that region. In another implementation, the displacement of a facial marker data point is distributed over a corresponding region according to a thickness function associated with that region. In another implementation, the displacement of a facial marker data point is distributed over a corresponding region according to a density function associated with that region.

Figure 3:
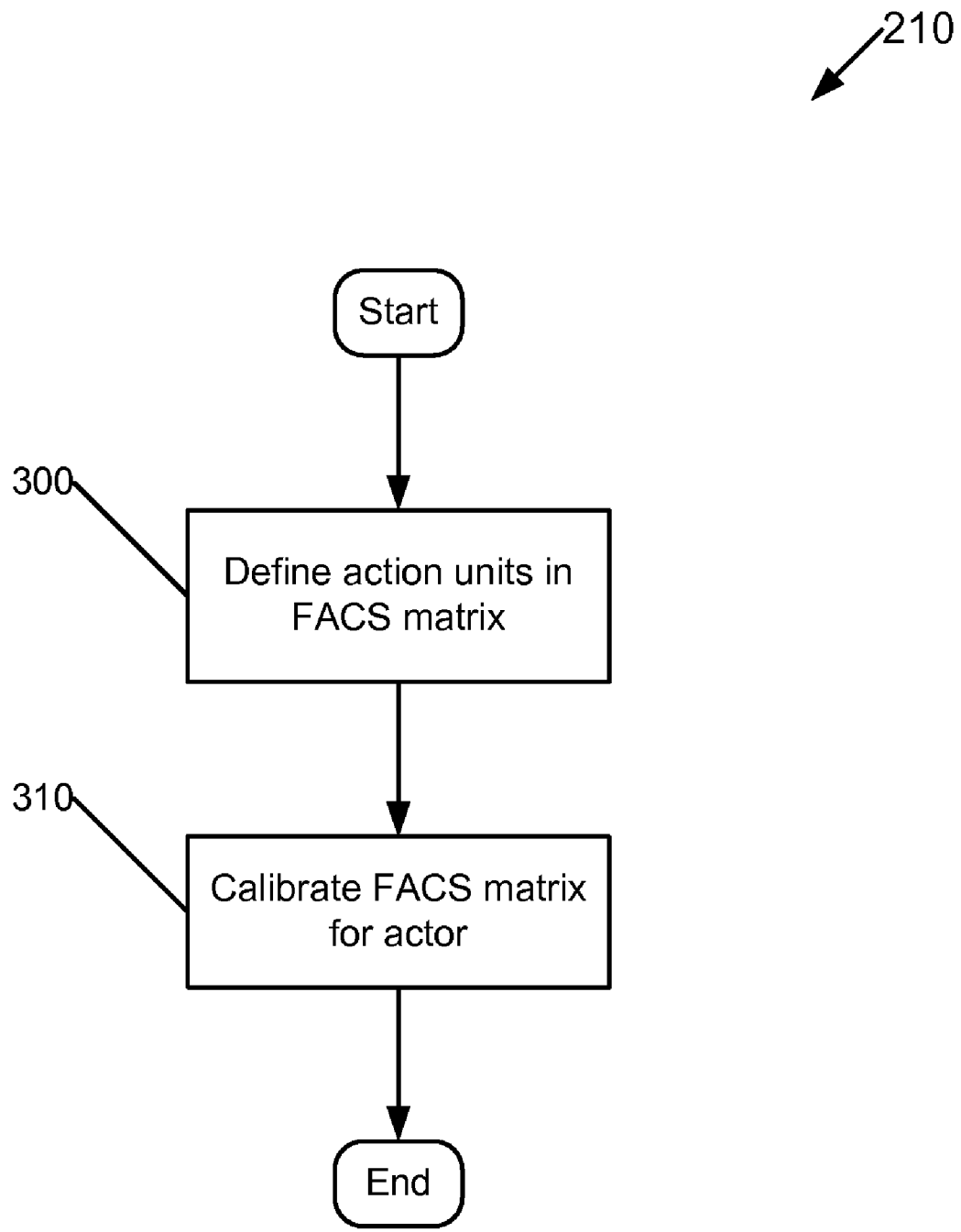
FIG. 3 is a flowchart illustrating a method of initializing a FACS matrix in accordance with one implementation.

FIG. 3 is a flowchart illustrating a method 210 of initializing a FACS matrix in accordance with one implementation.

According to a FACS, the human face has muscles that work together in groups called "actions units." A FACS provides a framework for determining when certain action units are triggered and how to assign to each action unit a relative influence over a given facial pose. Facial expressions are categorized into a plurality of distinct action units. Each action unit defines a muscular activity ("activation") that produces a momentary change in facial appearance. The changes in facial appearance vary from person to person depending on facial anatomy, e.g., bone structure, fatty deposits, wrinkles, the shapes of various facial features, and other related facial appearances. However, certain commonalities are seen between people as these action units are triggered. An action unit used in a FACS is based on the location on the face of the facial action, and the type of facial action involved. For example, the upper face has muscles that affect the eyebrows, forehead, and eyelids, whereas the lower muscles around the mouth and lips form another group. Each of these muscles work in groups to form action units, and the action units can be broken down further into left and right areas of the face, which can be triggered asymmetrically and independently of each other.

At block 300, action units are defined for a FACS matrix. In one implementation, the FACS matrix includes 64 action units, each action unit representing a particular facial expression, and defining groups of facial muscle activations working together to generate the facial expression. Action units are further broken down to represent left and right sides of the face, with which asymmetrical facial poses are represented.

The action units of the FACS matrix are calibrated, at block 310. In one implementation, each actor has a unique, individualized FACS matrix. Each action unit maintained by the actor's FACS matrix is calibrated by motion capturing the actor's performance of the pose corresponding to the action unit. Facial marker data are captured as described above, FACS cleaned, and assigned to the FACS matrix in correspondence with the particular action unit. In another implementation, the actor performs each pose in an extreme manner to establish expected bounds for facial marker excursions when the pose, or a similar pose, is performed during a beat.

Figure 4:
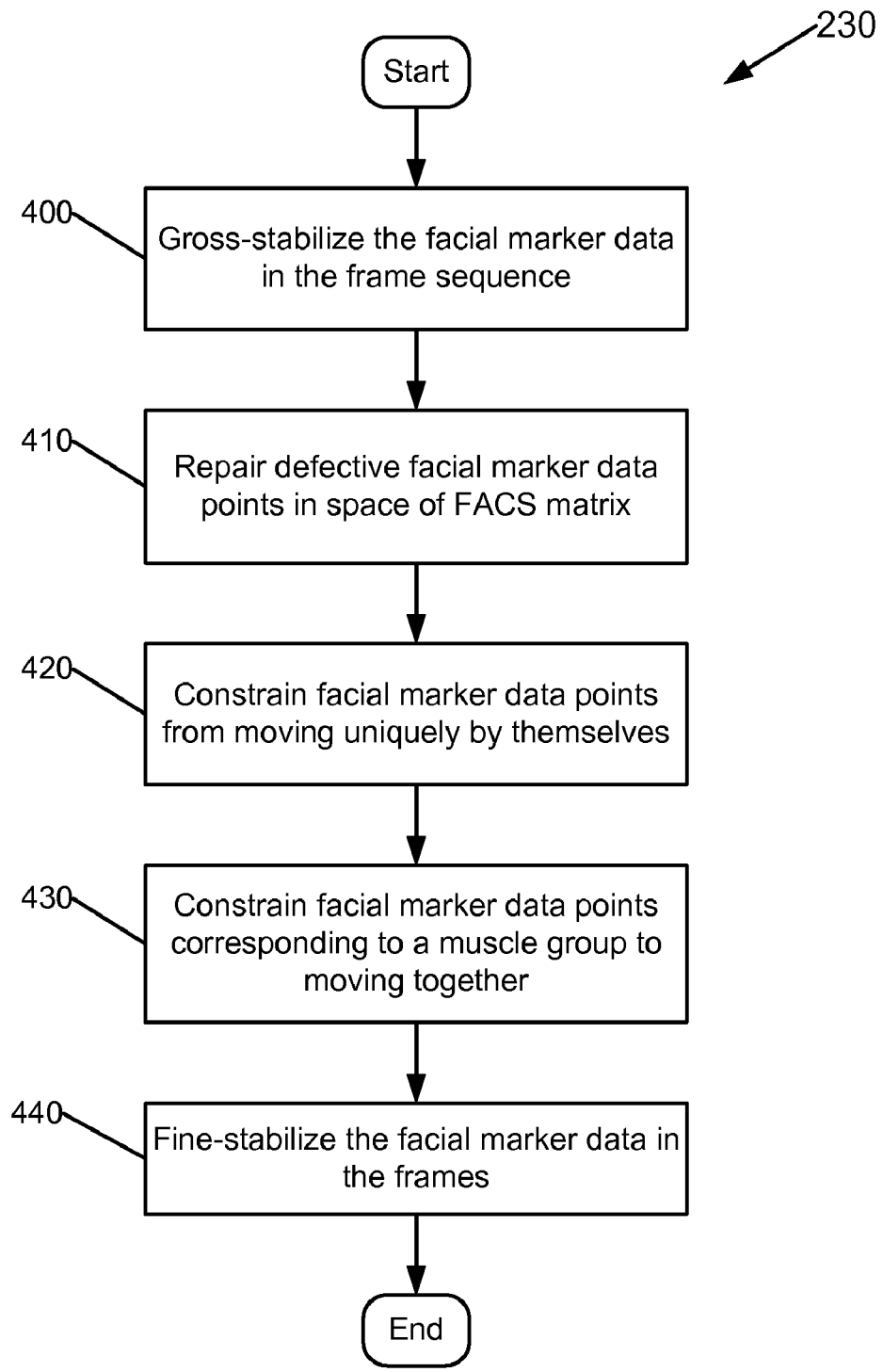
FIG. 4 is a flowchart illustrating a method of cleaning facial marker data in accordance with one implementation.

FIG. 4 is a flowchart illustrating a method 230 of cleaning facial marker data in accordance with one implementation.

The facial marker data of the frame sequence are gross-stabilized, at block 400. During the course of a facial motion capture beat, an actor may execute relatively gross head movements, including translational and rotational movements, in addition to more subtle motions related to facial expressions. In one implementation, the gross head movements are eliminated to better expose the subtle movements of the actor's facial expressions, resulting in translation- and rotation-invariant facial marker data. For example, a first frame of facial marker data is identified. Other frames of facial marker data in the frame sequence are aligned to the facial marker data of the first frame according to two or more predefined rigid points on the actor's face. Such rigid points include facial marker data points corresponding to markers attached at the head, ears, and bridge of the nose, for example. Generally, rigid points are selected such that they are invariant with respect to the actor's facial expression, but yet capture the actor's physical movements in the motion capture performance space. A spatial coordinate system is defined for the sequence of frames according to the rigid points. Remaining movements of the facial marker data are therefore related substantially only to facial expressions, and are defined accordingly in the spatial coordinate system.

Defective facial marker data points are repaired in the space of the FACS matrix, at block 410. In one implementation, frames of the actor's performance are analyzed in the space of all the FACS poses (i.e., action units) of the FACS matrix. As such, the FACS poses may be viewed as facial basis vectors defined by spatial data points. A weight for each facial basis vector is computed for an incoming frame, such that the weighted combination of FACS poses (i.e., facial basis vectors) approximates the new pose in the incoming frame. The facial marker data points of the new pose are then compared to the weighted combination of FACS poses to determine whether there are any missing, mislabeled, or unacceptably noisy facial marker data points. Any such defective facial marker data points are replaced in the incoming frame with an appropriate data point from the weighted combination of FACS poses.

Facial marker data points are constrained from moving uniquely by themselves, at block 420. This constraint is generally applicable because the likelihood of a single, particular facial marker data point moving in a significantly different manner than the neighboring facial marker data points is low, so unique behavior by a single facial marker data point typically indicates defectiveness. Once determined, the improper movement of the data point can be modified.

The facial marker data points are constrained to moving together with a corresponding muscle group, at block 430. In one implementation, facial marker data points are not permitted to move in ways that would be unnatural with respect to the muscle group to which it belongs.

The facial marker data are fine-stabilized in the frames, at block 440. The spatial positions of the facial marker data points are fine-stabilized by determining marker movements relative to a facial surface model. In one implementation, the spatial positions of the facial marker data points are fine-stabilized by adjusting facial marker data point movements to conform to a pre-determined facial surface model. In another implementation, fine-stabilization is accomplished using the facial poses maintained in the FACS matrix to adjust outlying facial marker data points. In a further implementation, the facial marker data points are fine-stabilized manually using rigid markers.

In summary, the stabilization is handled in two ways—gross stabilization and fine stabilization. Gross stabilization makes use of rigid markers affixed on the body (e.g., head/face markers). These rigid markers are large enough that a transformation matrix can be computed to transform the position of the rigid markers (head/face) from their location in space to a canonical origin so that all analysis of facial expressions can be done in a lock down position. However in the presence of noise, inconsistent labels, and other anomalies (e.g., in facial expressions), the gross stabilization transform computed to lock down the head on a frame-by-frame basis is not consistent, which causes minor shakes, twists, pops, and other noises. When these data are used for facial retargetting, generation of good facial expression is difficult. Consequently, there is a need for fine stabilization, which removes the shakes, twists, pops and other noises. This can be accomplished by making use of the FACS matrix for the particular actor. The FACS matrix is used to analyze minor movements in markers as being consistent with a given expression. Thus, for an expression, a group of markers indicates a consistent movement as learned from or as derived by a FACS matrix. However, if the movement is not as consistent or is inconsistent, the movement can be rectified and "compensated" on the whole face so as to get the whole face (and/or head) more stabilized.

Figure 5:
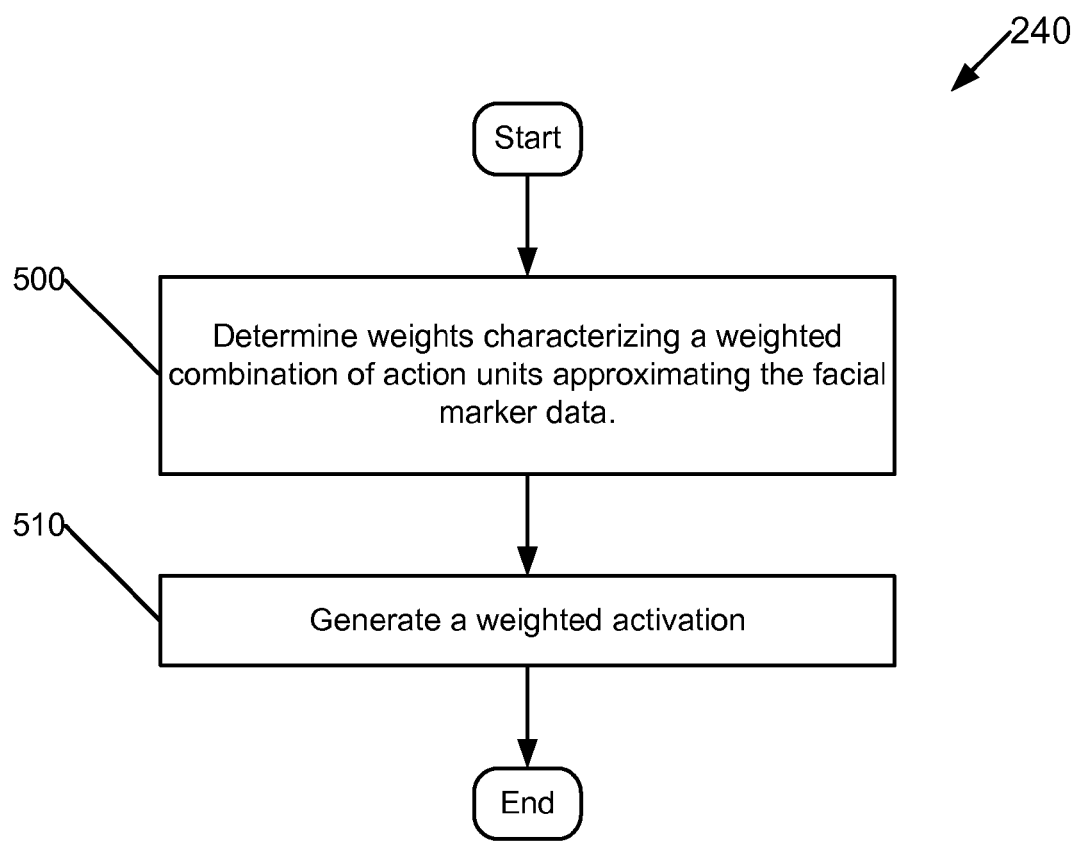
FIG. 5 is a flowchart illustrating a method of generating facial muscle activations from facial marker data in accordance with one implementation.

FIG. 5 is a flowchart illustrating a method 500 of generating facial muscle activations from facial marker data in accordance with one implementation.

Weights are determined, at block 500, to characterize a weighted combination of action units approximating a pose represented in an incoming frame of facial marker data. Action units representing activations of certain facial muscle groups can be regarded as facial basis vectors, as discussed above. Accordingly, one or more action units—including and up to all of the action units in the FACS matrix—are used as components of a weighted combination to approximate the pose in the incoming facial marker data. That is, the facial marker data are characterized as some combination of the predefined action units in the FACS matrix. Determining the weights involves fitting a weighted combination of the facial pose data associated with each action unit to the new facial pose data. In one implementation, a linear optimization, such as a least squares fit, is used to compute the optimal combination of weights. In another implementation, a non-linear optimization is used to perform the fit.

Once the weights are determined, a weighted activation is generated, at block 510. In one implementation, as discussed in relation to FIG. 2, the weights are applied to muscle group activations associated with each action unit and the resulting activations are combined to generate a weighted activation. The weighted activation is then applied to the digital facial model.

Figure 6:
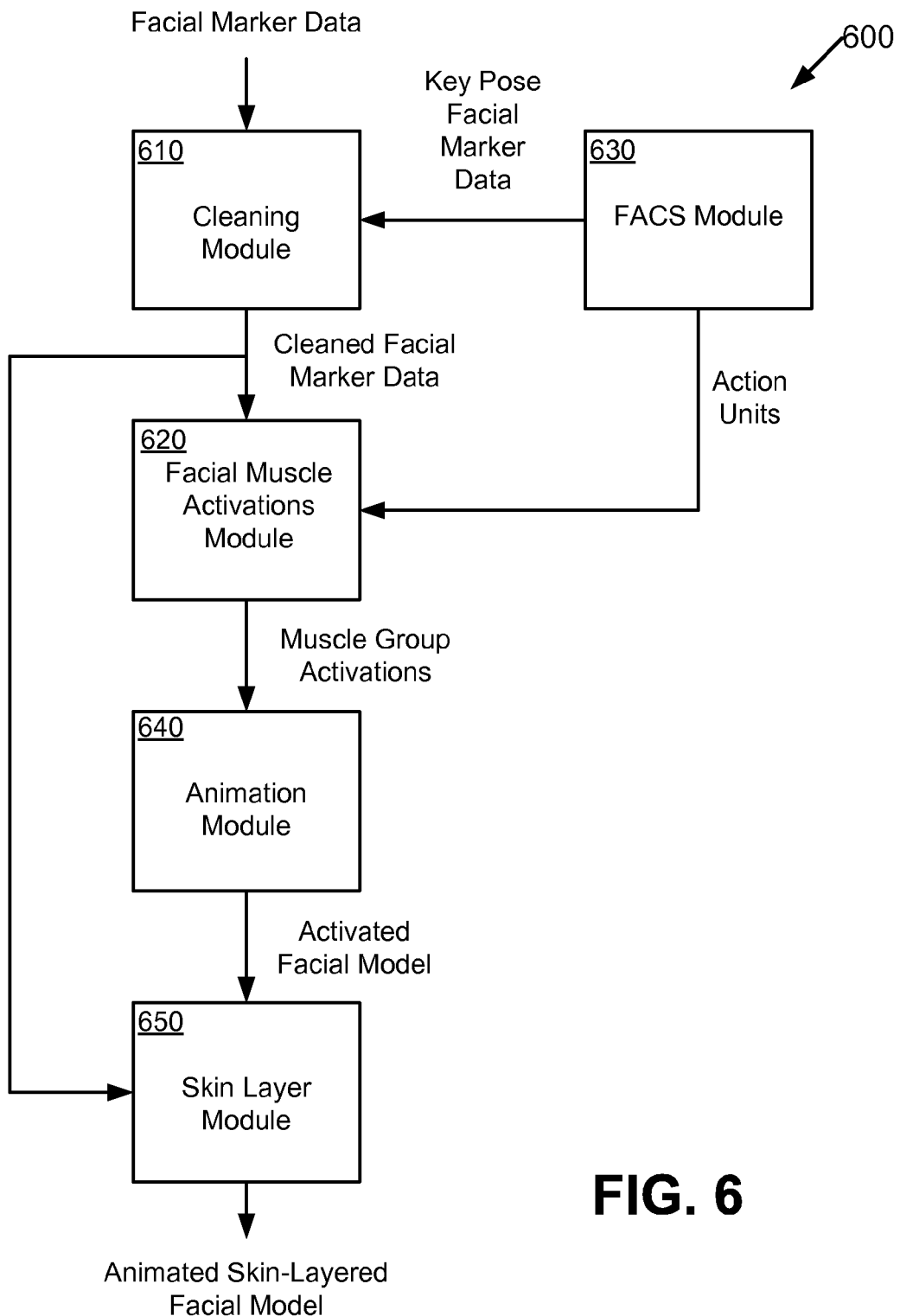
FIG. 6 is a functional block diagram of a system for animating a digital facial model according to one implementation of the present invention.

FIG. 6 is a functional block diagram of a system 600 for animating a digital facial model according to one implementation of the present invention. The system 600 includes a cleaning module 610, a facial muscle activations module 620, a FACS module 630, an animation module 640, and a skin layer module 650.

In the illustrated implementation of FIG. 6, the cleaning module 610 cleans the facial marker data to relieve the data of temporal-associative gaps, facial marker data point mislabeling, and noise. Temporal-associative gaps occur when labeling has failed for one or more facial marker data points in a frame, for example, resulting in a "gap" between the properly labeled points of the adjacent frames in the sequence. In one implementation, the cleaning is performed according to the method 400 illustrated by the flowchart of FIG. 4.

The facial muscle activations module 620 generates facial muscle activations from facial marker data. As discussed above in relation to FIG. 2, generating facial muscle activations essentially includes: determining weights that characterize a weighted combination of action units approximating the facial marker data; and generating a weighted activation. Generating facial muscle activations is described in more detail in FIG. 5.

The FAC module 630 initializes the FACS matrix essentially by defining FACS action units in the FACS matrix, and calibrating associated poses for the actor.

The animation module 640 animates a computer graphics ("CG") facial model using the facial muscle activations generated in the facial muscle activations module 620. In one implementation, the CG facial model is a digital facial model that has been "rigged" by an artist or animator. Rigging the digital facial model includes setting up different fascia layers, which are blended to create a final facial deformation on the digital facial model. The fascia layers in one implementation include a muscle layer that allows facial muscle deformations, a jaw layer that allows jaw movement, a volume layer that controls skin bulges in different facial areas, and an articulation layer for pronounced lip movement.

The muscle layer includes skull patches with muscle controls that deform the face. The muscle controls are activated by weighted activations generated from motion capture data. The jaw layer helps to control movements of the jaw of the digital facial model. The volume layer adds volume to the deformations occurring on the digital facial model. Thus, the volume layer aids in modeling wrinkles and other facial deformations, which can be triggered by weighted activations generated from motion capture data. The articulation layer relates to the shape of the lips as they deform. In particular, the articulation layer aids in controlling the roll and volume of lips, which is essential when the lips thin out or pucker in facial expressions. Facial marker data are mapped, or retargeted, onto the digital facial model as weighted activations that trigger the various fascia layers. That is, the weights quantify the proportional influence that each of one or more predetermined poses exerts in triggering the fascia layers.

Sometimes, however, triggering the fascia layers with the weighted activations as discussed leads to an undesired segmentation effect on the surface of the CG facial model. That is, the various muscle groups that are triggered exhibit discontinuities at their interstices. Overlaying the CG facial model with a separate skin layer smoothes the interstitial discontinuities, and provides another medium through which an artist or animator can control the appearance of the resulting facial animation.

Accordingly, the skin layer module 650 generates the skin layer overlaying the CG facial model. In one implementation, this skin layer is generated as a separate component from the four fascia layers discussed above. The skin layer conforms to the outer surface of the CG facial model. It may be infused with various visual attributes, including, for example, a color, a texture, transparency, hair, and/or fur. The skin layer may also be infused with various physical attributes, including, for example, elasticity, thickness, and density. In another implementation, the skin layer is partitioned into a plurality of regions, each region corresponding to a facial marker data point.

The skin layer module 650 then animates the skin layer using the facial marker data. In one implementation, the movement of each facial marker on the actor, expressed in the trajectory of each facial marker data point through the sequence of frames, is transferred to a corresponding region of the skin layer. That is, each facial marker data point, which exhibits a spatial displacement (i.e., a change in spatial position) from frame to frame, exerts a corresponding displacement on the corresponding region of the skin layer. This module 650 is described in detail below.

Figure 7:
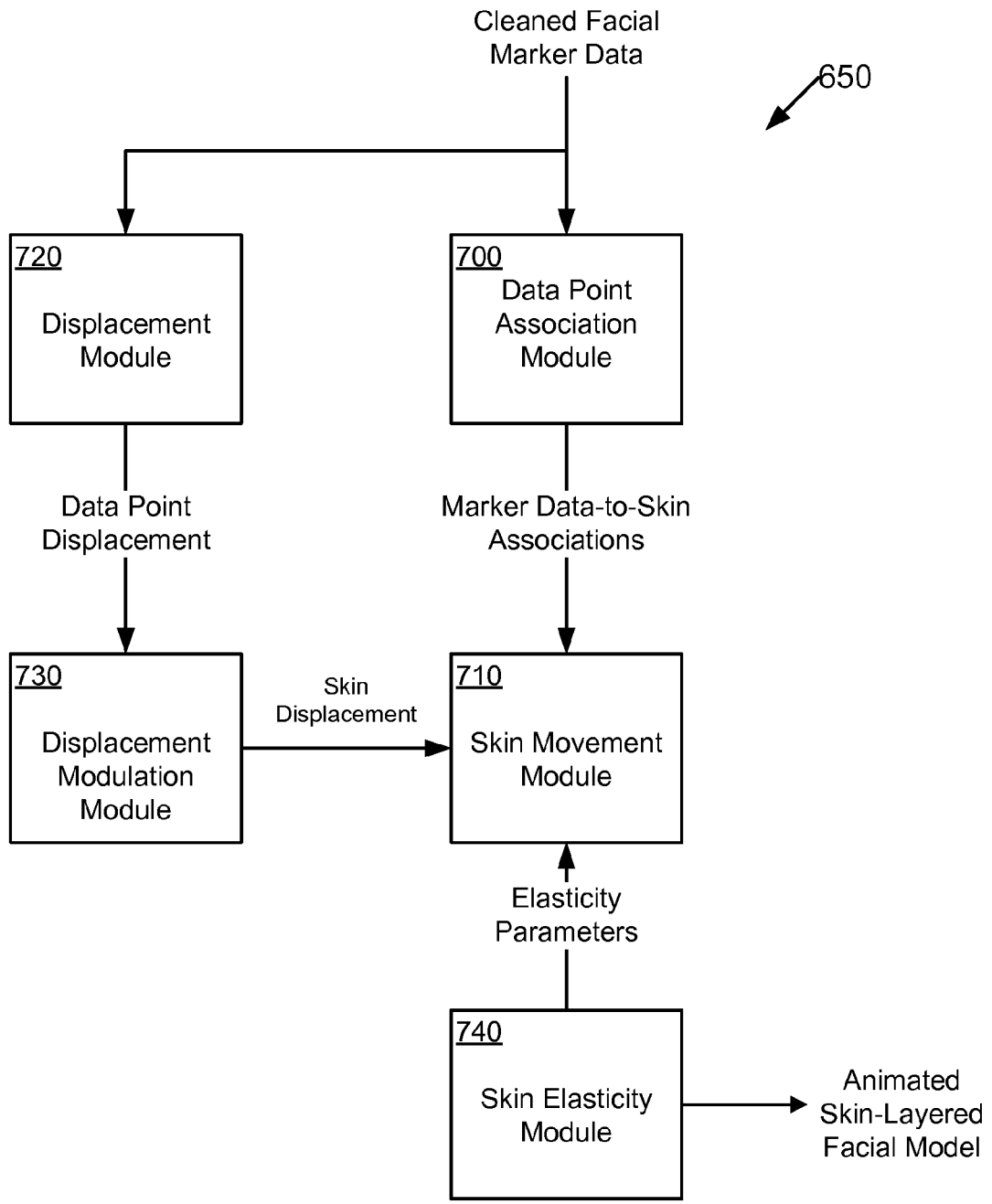
FIG. 7 is a functional block diagram of the skin layer module for generating an animated skin layer.

FIG. 7 is a functional block diagram of the skin layer module 650 for generating an animated skin layer. The skin layer module 650 includes a data point association module 700, a skin movement module 710, a displacement module 720, a displacement modulation module 730, and a skin elasticity module 740.

The data point association module 700 associates the markers (i.e., the facial marker data points) to regions (i.e., discrete "patches of skin") on the added skin layer on the animated model to produce associations of individual facial marker data points to corresponding regions of skin. The skin movement module 710 receives the associations and uses them to apply displacements in facial marker data points to their corresponding regions of skin.

The displacement module 720 computes a displacement between spatial positions of a marker. The displacement is used to pull a corresponding region of the added skin layer. The marker and the region correspond physically on the actor's face. The data point displacement computed by the displacement module 720 is used by the displacement modulation module 730 to modulate the displacement, e.g., by scaling, to obtain a desired result. The basic application of the displacement on the region of the skin layer would be one to one. For example, an inch of marker displacement means an inch of skin displacement. Thus, it may be desirable to modulate the displacement. The modulation may include altering a direction (e.g., vector) representing the displacement because the displacement is at least spatial.

The skin elasticity module 740 computes and/or applies an elasticity to a region of skin so that when the displacement is applied to it (in the skin movement module 710) the skin behaves in some predictable way.

Figure 8A:
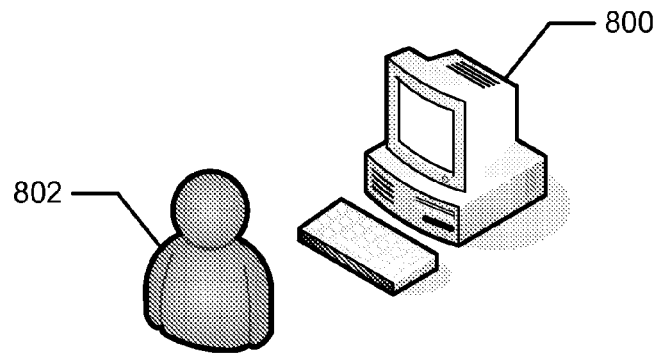
FIG. 8A is a diagram illustrating a user and computer system.

FIG. 8A illustrates a representation of a computer system 800 and a user 802. The user 802 can use the computer system 800 to perform FACS solving. The computer system 800 stores and executes a FACS solving system 890, which processes cleaned motion capture frame data.

Figure 8B:
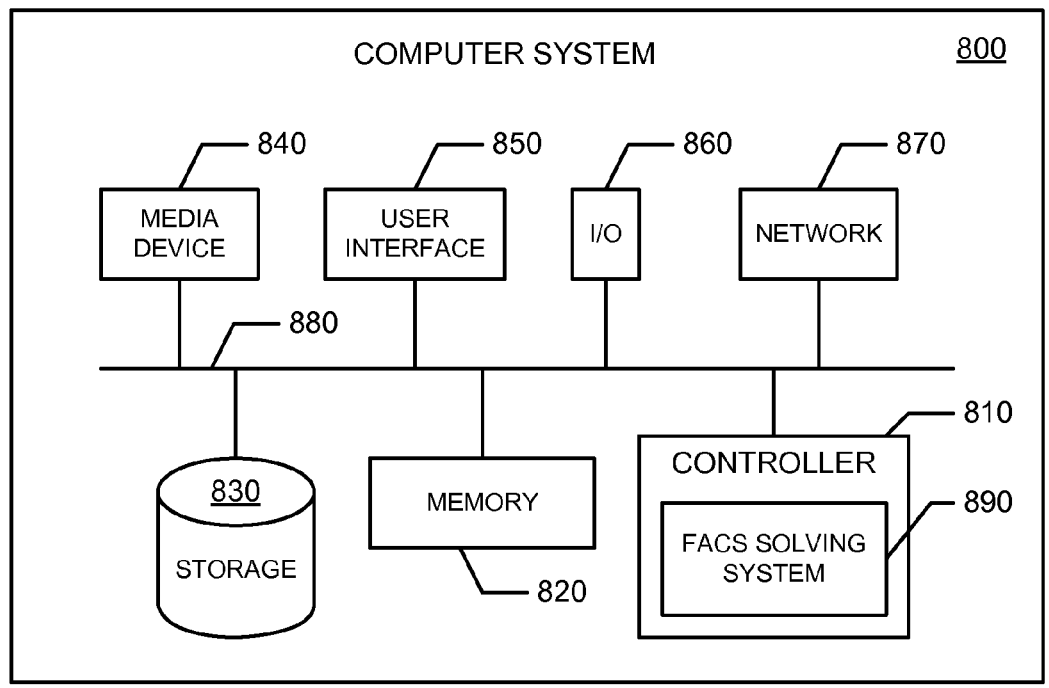
FIG. 8B is a functional block diagram illustrating the computer system hosting the FACS solving system.

FIG. 8B is a functional block diagram illustrating the computer system 800 hosting the FACS solving system 890. The controller 810 is a programmable processor and controls the operation of the computer system 800 and its components. The controller 810 loads instructions from the memory 820 or an embedded controller memory (not shown) and executes these instructions to control the system. In its execution, the controller 810 provides the FACS solving system 890 as a software system. Alternatively, this service can be implemented as separate components in the controller 810 or the computer system 800.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by other components of the computer system 800, such as for storing data used by the FACS solving system 890. In one implementation, storage 830 is a hard disk drive.

The media device 840 receives removable media and reads and/or writes data to the inserted media. In one implementation, the media device 840 is an optical disc drive.

The user interface 850 includes components for accepting user input from the user of the computer system 200 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (including, but not limited to 802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

Various illustrative embodiments of the present invention have been described. However, one of ordinary skill in the art will recognize that additional embodiments are also possible and within the scope of the present invention. For example, although the FACS solving system has been described generally in terms of facial marker data, the system can be applied to other types of motion capture marker data, such as body marker data. Further, it will be appreciated that grouping functionalities within a module or block is for ease of description. Specific functionalities can be moved from one module or block to another without departing from the invention.

Accordingly, the present invention is not limited to only those embodiments described above.

What is claimed is:

1. A method, implemented in a computer system, comprising:
   generating facial muscle activations from facial marker data by determining weights that characterize a weighted combination of action units approximating the facial marker data,
   wherein each action unit of the action units defines a predetermined facial muscle activation that produces a change in facial appearance;
   animating, the computer system, a computer graphics facial model using the facial muscle activations;
   generating a skin layer overlaying the computer graphics facial model; and
   animating the skin layer using the facial marker data.

2. The method of claim 1, wherein the action units are maintained in a FACS matrix.

3. The method of claim 1, wherein the facial marker data include
   a plurality of frames, each frame including a plurality of data points, and each data point including a spatial position,
   wherein each data point of each frame is temporally associated with a data point of at least one other frame of the plurality of frames.

4. The method of claim 3, wherein said animating the skin layer includes:
   associating a data point of a particular frame with a corresponding area of the skin layer; and
   moving the corresponding area of the skin layer.

5. The method of claim 4, wherein said moving corresponds to
   a displacement between the spatial positions of the data point of the particular frame and the temporally associated data point of the at least one other frame.

6. The method of claim 5, wherein said moving includes
   applying the displacement at a predetermined position related to the corresponding area of the skin layer.

7. The method of claim 5, wherein the displacement is modulated.

8. The method of claim 4, wherein said moving corresponds to
a predefined elasticity of the corresponding area of the skin layer.

9. The method of claim 3, further comprising
repairing a defective data point of an intervening frame.

10. The method of claim 9, wherein the defective data point includes
a missing data point, a mislabeled data point, and a noisy data point.

11. The method of claim 9, wherein the defective data point is
temporally associated with a data point of a particular frame and the temporally associated data point of the at least one other frame.

12. The method of claim 11, wherein the intervening frame is
temporally positioned between the particular frame and the at least one other frame.

13. The method of claim 11, wherein said repairing a defective data point includes
estimating the spatial position of a replacement data point of the intervening frame.

14. The method of claim 13, wherein said estimating the spatial position of the replacement data point includes
interpolating among a plurality of predefined frames.

15. The method of claim 14, wherein the plurality of predefined frames are maintained in a FACS matrix.

16. A system, comprising:
a facial muscle activations module to receive facial marker data and to generate facial muscle group activations by determining weights that characterize a weighted combination of action units approximating the facial marker data,
wherein each action unit of the action units defines a predetermined facial muscle activation that produces a change in facial appearance;
an animation module to receive the facial muscle group activations and generates an activated facial model; and
a skin layer module to receive the activated facial model and the facial marker data, and to generate an animated skin-layered facial model.

17. The system of claim 16, wherein the action units are maintained in a FACS matrix.

18. The system of claim 16, wherein the facial marker data include
a plurality of frames, each frame including a plurality of data points, and each data point including a spatial position,
wherein each data point of each frame is temporally associated with a data point of at least one other frame of the plurality of frames.

19. The system of claim 18, wherein said skin layer module includes:
a data point association module to associate a data point of a particular frame with a corresponding area of the skin layer; and
a skin movement module to move the corresponding area of the skin layer.

20. The system of claim 19, wherein the skin layer module includes
a displacement module to generate a displacement between the spatial positions of the data point of the particular frame and the temporally associated data point of the at least one other frame.

21. The system of claim 20, wherein said skin movement module includes
a unit to apply the generated displacement at a predetermined position related to the corresponding area of the skin layer.

22. The system of claim 20, wherein the skin layer module further includes
a displacement modulation module to modulate the displacement.

23. The system of claim 19, wherein said skin layer module includes
a skin elasticity module to compute and apply a predefined elasticity to the corresponding area of the skin layer so that the skin behaves in some predictable way.

* * * * *